Feb. 17, 1970     N. A. KEITH     3,495,657
FINNED TUBE

Original Filed April 12, 1967     4 Sheets-Sheet 1

INVENTOR:
NORVAL A. KEITH
BY Henry W. Cummings
ATTORNEY

Feb. 17, 1970    N. A. KEITH    3,495,657
FINNED TUBE

Original Filed April 12, 1967    4 Sheets-Sheet 2

INVENTOR:
NORVAL A. KEITH
BY
ATTORNEY

INVENTOR:
NORVAL A. KEITH
BY
ATTORNEY

Feb. 17, 1970  N. A. KEITH  3,495,657
FINNED TUBE
Original Filed April 12, 1967  4 Sheets-Sheet 4
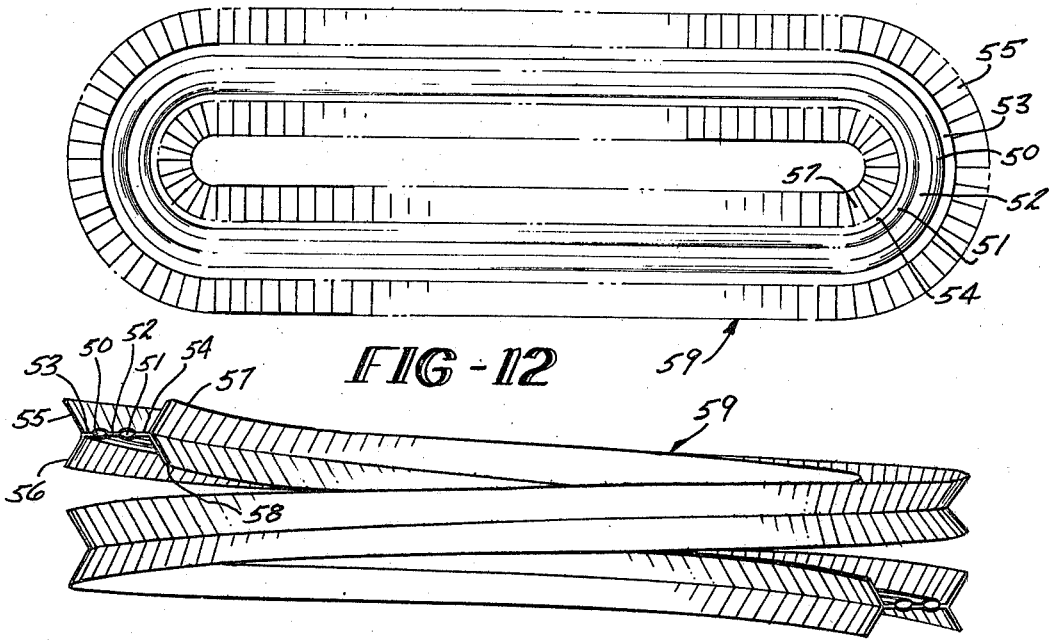
FIG-12
FIG-11
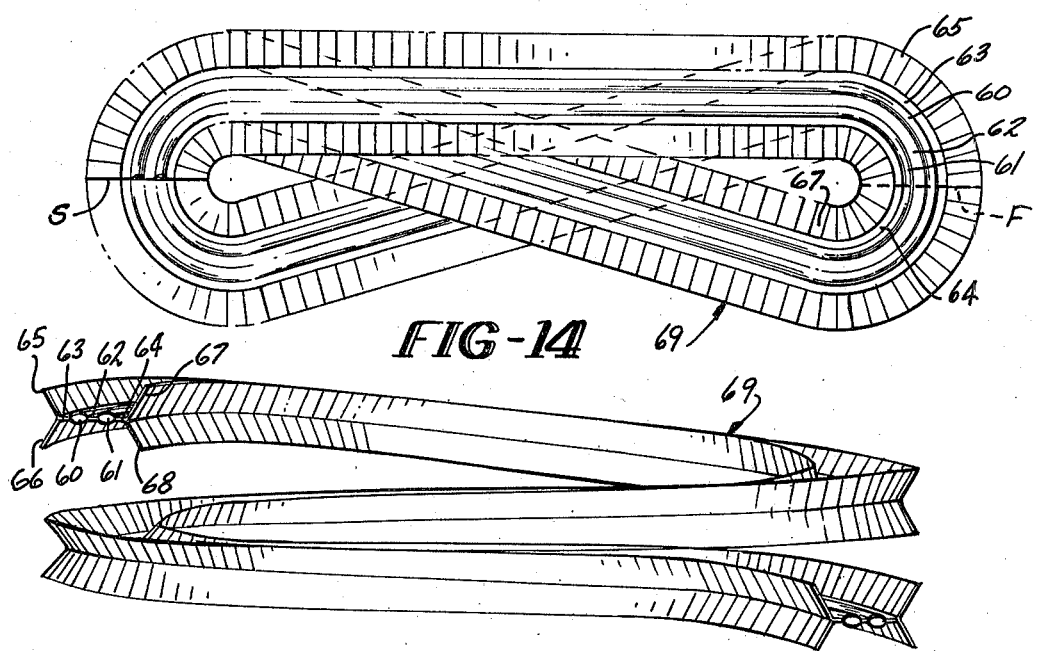
FIG-14
FIG-13
INVENTOR:
NORVAL A. KEITH
BY
ATTORNEY United States Patent Office 3,495,657
Patented Feb. 17, 1970

3,495,657
FINNED TUBE
Norval A. Keith, East Alton, Ill., assignor to Olin Mathieson Chemical Corporation, a corporation of Virginia
Continuation of application Ser. No. 630,376, Apr. 12, 1967. This application Nov. 1, 1968, Ser. No. 774,577
Int. Cl. F28f 1/14; B21b 31/08; B21d 53/02
U.S. Cl. 165—183                                            10 Claims

ABSTRACT OF THE DISCLOSURE

A heat exchange component is provided which is made of at least two sheets of metal joined together to define a cavity through which a cooling medium is passed. The edge portions of the sheets are bent and may be serrated to provide large surface area for heat exchange.

---

This application is a continuation of 630,376, filed Apr. 12, 1967, now abandoned.

This invention utilizes a process for continuous strip bonding of at least two sheets of material in selective areas to provide a passageway or passageways for tubes, and bending of the sheets in edge areas for extended surface for heat exchange.

A continuous strip of metal is patterned through a continuous patterning operation, and is mated with at least one other sheet. The sheets are then either hot rolled or cold rolled to bond the sheets together at places where there is no weld-inhibiting material. Subsequent cold rolling may or may not be necessary if hot rolling has been used for the bonding. After rolling, and annealing if necessary, the layers may be separated along the edge of the continuous strip so as to provide a two or more layer finned surface. This fin area can then be cut and bent, if desired, and the bent portions may be twisted into the desired fin configuration. The so-bent strip can be bent into desired heat exchange shapes, for instance into a spiral, serpentine, etc.

FIGURE 11 is a perspective view of a heat exchange component according to another embodiment of the present invention.

FIGURE 12 is a top view of FIGURE 11.

FIGURE 13 is a perspective view of a heat exchange component according to another embodiment of the present invention.

FIGURE 14 is a top view of FIGURE 13.

The method of processing is based on Grenell Patent 2,690,002 assigned to the same assignee as the present application. Briefly, two or more sheets of metal, which for example, may be aluminum alloys or copper alloys, are first cleaned and brushed. Next, an appropriate pattern is applied to at least one of the sheets. For a multi-sheet article, weld-inhibiting material would be applied to one or more sheets, depending upon the resulting pattern desired.

Figure 1:
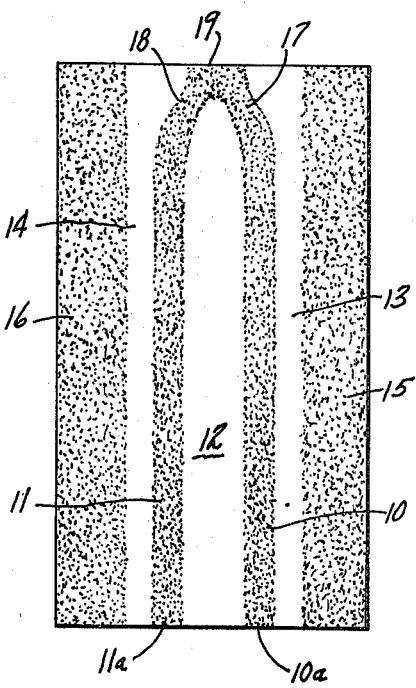
FIGURE 1 is a view of the pattern of weld-inhibiting material to be applied to one sheet of metal according to the process of the invention.

As shown in FIGURE 1, using a two-sheet article as an example, this pattern may comprise two strips 10 and 11. Strips 12, 13 and 14 are provided which contain no weld-inhibiting material. However, in one embodiment of the invention, external strips 15 and 16 are provided with weld-inhibiting material. If desired, the weld-inhibiting strips 10 and 11 may merge at 17 and 18 to provide an inlet portion 19. However, if desired, the patterns 10 and 11 may be so designed as to constitute a repeatable pattern and may form conduits of varying sizes. Also, if desired, the patterns 10 and 11 may merely extend to the edge of the sheets as shown at 10a and 11a.

After application of the pattern, the sheets are bonded together at places on their surfaces which do not contain weld-inhibiting material. This can be done by either hot rolling or cold rolling.

Hot rolling and annealing temperatures will vary with the metals being processed. The process can be used in processing varied metal systems, but is particularly adapted to treating aluminum and aluminum alloys, copper and copper alloys, and steel. For example, aluminum sheets can be processed by heating the sheets to a temperature of between approximately 800 and 1000° F., preferably approximately 900 to 950° F. After heating, the sheets are hot worked to a reduction in gage of at least 60%. However, a greater amount of reduction will improve the bond and a reduction of approximately 65% is preferred.

The bonding can also be done by cold rolling, in which a reduction of for example 70% is achieved in the first pass. A second cold reduction pass may or may not be used. However, if only one pass is used, the reduction may be even greater than 70%. The gage must be reduced by approximately four to one.

As is known to those skilled in the art, in both hot and cold rolling, such process difficulties as control of camber must be controlled by known methods.

If hot rolling is used, following the hot reduction, the bonded sheets are preferably cold rolled, for example, to a reduction of about 35% and then annealed. As an example, for aluminum and aluminum alloy sheets, a temperature of approximately 650 to 1000° F. is preferably used. If there has been no cold rolling, annealing is not necessary. Of course, if all cold reduction has been used in the bonding, annealing at the indicated temperatures is necessary. The bonded composite is first slit to trim ragged edges prior to annealing and then sheared to the desired length after annealing. If desired, the welded sheets may be cut in the other direction to provide long thin strips. The sheared composite is then inflated. For example, an inflation pressure of from approximately 500 to 3000 p.s.i. may be used.

Figure 3:
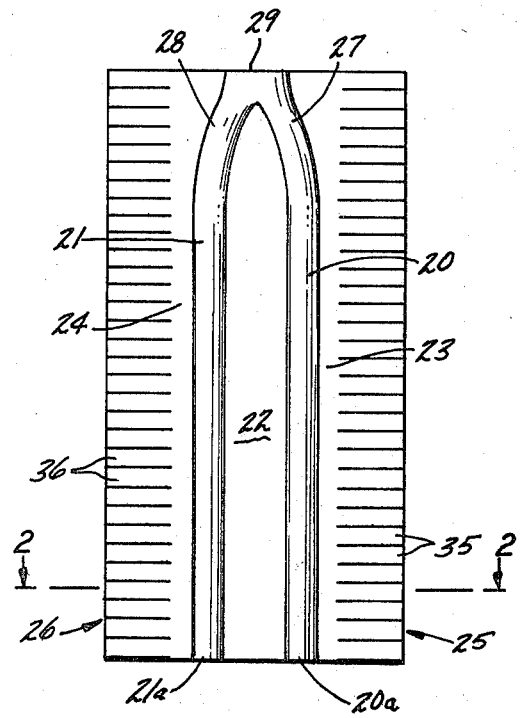
FIGURE 3 is a top view of the heat exchange component of the present invention in an intermediate stage of fabrication.
Figure 2:
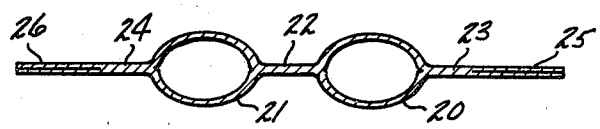
FIGURE 2 is a sectional view of the heat exchange component of the present invention in one stage of fabrication.

After the inflation operation, the article has a shape shown in FIGURES 2 and 3. The patterns of weld-inhibiting material 10, 11, 17, 18 and 19 have resulted in corresponding tubular portions 20, 21, 27, 28 and 29. The sections 12, 13 and 14 have resulted in bonded portions 22, 23 and 24, respectively. If weld-inhibiting material was placed on sections 15 and 16 in FIGURE 1, unbonded portions 25 and 26 will still contain the weld-inhibiting material as shown in FIGURE 2.

The article shown in FIGURES 2 and 3 may or may not be cut. If cutting is done, it takes place in portions 25 and 26, resulting in a plurality of slitted portions 35 and 36. The cutting operation can be done by means of conventional equipment.

Figure 4:
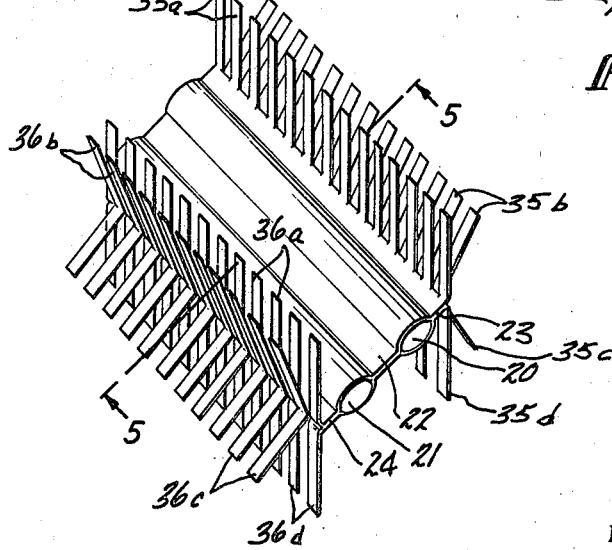
FIGURE 4 is a schematic view of the heat exchange component according to the present invention.
Figure 5:
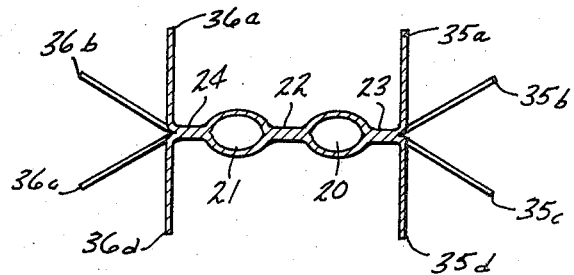
FIGURE 5 is a sectional view along the lines 5—5 in FIGURE 4.

If cutting has been done, the cut edge portions may then be bent to a desired fin configuration as shown in FIGURES 4 and 5. It will be apparent that the portions 35a, 35b, 35c, and 35d, and 36a, 36b, 36c, and 36d have been bent to a varying extent.

Figure 6:
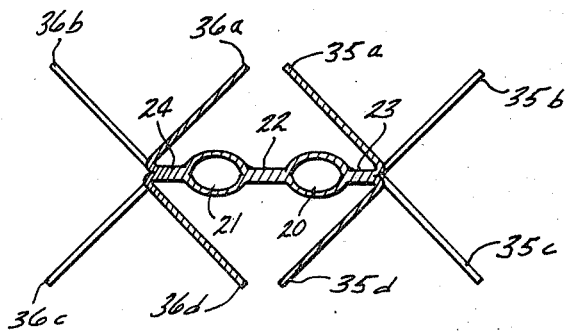
FIGURE 6 is a sectional view of a modified heat exchange component according to the present invention.

The extent to which the cut portions are bent is a matter of design. For example, as shown in FIGURE 6, the portions 35a and 35d and 36a and 36d have been bent even further in this embodiment than shown in FIGURE 5.

Figure 7:
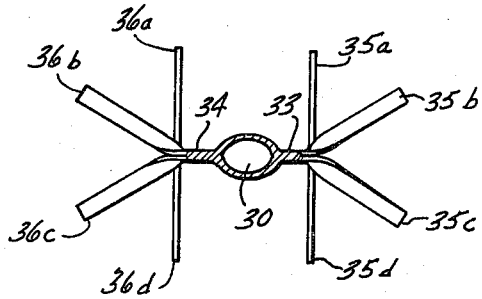
FIGURE 7 is a sectional view of a modified heat exchange component according to the present invention.

In FIGURE 7, the members 35b, 35c and 36b and 36c have not only been bent, but have been rotated or twisted approximately 90°, while the members 35a, 35d and 36a and 36d have been bent, but not rotated.

If weld-inhibiting material was not placed upon either of the sections 15 and 16 in FIGURE 2, according to another embodiment of the invention, the portions 25 and 26 may be cut as shown in FIGURE 3 and then each cut portion may be bent and/or rotated a desired amount to form fin area.

Figure 8:
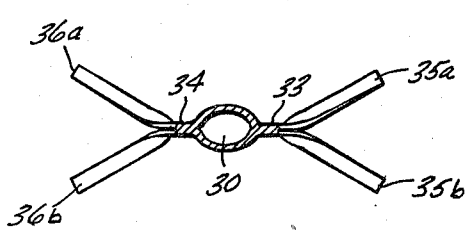
FIGURE 8 is a sectional view of a modified heat exchange component according to the present invention.

For example, in FIGURE 8, every other cut portion 35a, 36a has been rotated upwardly, while every other cut portion 35b, 36b has been rotated downwardly.

Whether or not weld inhibiting material has been applied to the edge portions, the extent of the bending and rotating of the members will vary with design and the application and it will be apparent that many other designs of bending and rotating than those illustrated may be employed within the scope of the present invention.

The drawings in the present application show, as an example, a two-conduit unit in FIGURES 1 through 6. However, in many applications only one conduit will be used, as illustrated in FIGURES 7 and 8. The conduit 30 and welded portions 33 and 34 are obtained by using an appropriate weld-inhibiting pattern and following a technique previously described in regard to a two-conduit pattern. It is apparent that any number of conduits may be provided within the scope of the present invention, by providing the appropriate weld-inhibiting pattern upon the appropriate sheets.

Figure 10:
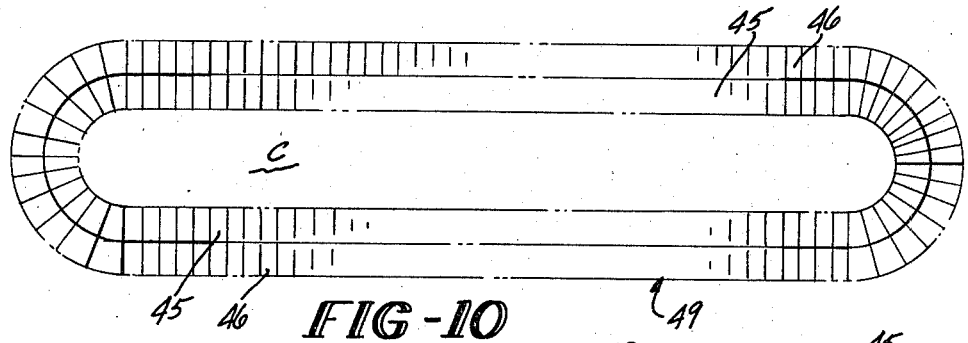
FIGURE 10 is a top view of FIGURE 9.
Figure 9:
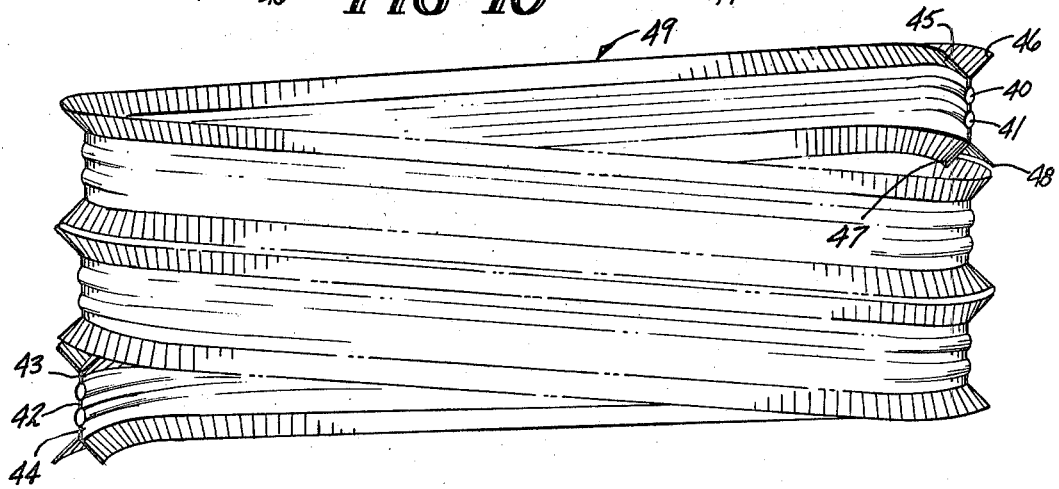
FIGURE 9 is a perspective view of a heat exchange component according to the present invention.

Varying lengths of the heat exchange components shown in FIGURE 4 may be produced. For many applications it is desirable to produce long lengths of such components. One such embodiment is shown in FIGURES 9 and 10. The article 49 has fin sections 45, 46, 47 and 48, conduit sections 40 and 41, and welded portions 42, 43 and 44. In FIGURE 9, the fin sections 45, 46, 47 and 48 are shown as having been formed by cutting prior to being bent. However, it is to be understood that these fin sections could also be made by omitting the cutting and merely bending the separated sheets.

Figure 10A:
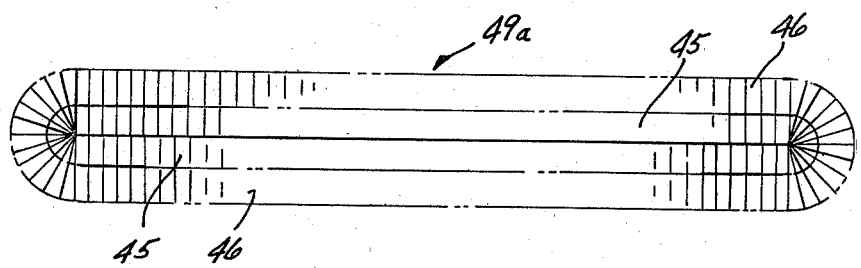
FIGURE 10A is a top view of a modification of the invention shown in FIGURE 9.

In FIGURE 9, it is seen that the article has been bent into a spiral. This spiral unit can be used in forced air evaporators, such as those presently used in forced air refrigerators. If desired, as shown in FIGURE 10A, the spiral may be wound more tightly to avoid the center C in FIGURE 10, to form the article 49a.

In FIGURE 9, it will be apparent that a transverse section appears where the numbers 40, 41 and 45–48 appear. In this transverse cross section, the major axis of the component passes through the bonded portions which are on either side of passageways 40 and 41. It will be apparent that the major axis in which the shape is bent and the major axis of the component in a transverse cross section are parallel in FIGURES 9, 10 and 10A.

FIGURES 11 and 12 show a structure similar to that shown in FIGURE 9. The article 59 again has conduit portions 50 and 51 together with welded portions 52, 53 and 54. The fins 55, 56, 57 and 58 may be formed according to either of the methods described in regard to FIGURE 9 (with or without cutting). The basic difference between the embodiments shown in FIGURES 11 and 12 and that shown in FIGURES 9 and 10 is that the axis of the component of which the spiral is formed is clearly different. The article 59 has the advantage that it can be used as either an air evaporator or a condenser heat exchanger with air flow across the convolutions.

FIGURES 13 and 14 show an article 69 again having conduit portions 60 and 61 together with welded portions 62, 63, 64 and fins 65, 66, 67 and 68. However, the article 69 is bent in a shape of a figure eight so as to provide more surface area in the center section of the unit.

FIGURE 14 is a top view of FIGURE 13 and includes a starting line S and a dotted finish line F in tracing the path of the figure eight shown in FIGURE 14.

It will be apparent in the embodiment shown in FIGURES 11 and 12 and 13 and 14 that in a transverse cross section, the major axis of the component and the axis of the shape into which the article is bent are perpendicular.

It will be apparent to those skilled in the art that the heat exchange components of the present invention can be bent and/or wound into many other shapes to suit particular heat exchange applications.

It will also be apparent that the conduit portions must be appropriately connected to sources of the heat exchange medium to be passed therethrough by couplings known to those skilled in the art. For instance, soldered or brazed couplings may be used, or in some instances, rubber hose-type couplings can be used. The couplings are known in the art and do not form a port of the present invention except insofar as said couplings are associated with the heat exchange components of the present invention.

It is to be understood that the invention is not limited to the illustrations described and shown herein, which are deemed to be merely illustrative of the best modes of carrying out the invention, and which are susceptible of modifications of form, size, arrangement of parts and detail of operation. The invention rather is intended to encompass all such modifications which are within the spirit and scope of the invention as set forth in the appended claims.

What is claimed is:

1. A formable heat exchange component comprising two sheets of metal each of which cooperate to completely define at least one unobstructed tubular passageway; said component having at least one edge portion defined by the same two sheets of metal which define said tubular passageway; said edge portion being separated from said tubular passageway by a bonded portion in which said sheets of metal are pressure welded together; said sheets being bent apart from each other in said edge portion to provide efficient heat exchange surface; said edge portion of said sheets being cut into segments; said edge portion being in heat exchange relation with said tubular passageway, the heat exchange between said tubular passageway and said edge portion taking place substantially completely through the said two sheets of metal which define said tubular passageway, said heat exchange component being formed of sheet metal which renders it formable into curved sections comprising a U-shaped bend.

2. A heat exchange component according to claim 1 in which adjacent segments cut from the same sheet are bent a differing extent with respect to a plane passing through said bonded portion.

3. A heat exchange component according to claim 1 in which at least some of said segments are twisted to provide fin surface.

4. A heat exchange component according to claim 1 in which said sheets are bonded together in more than two strips and in which said sheets define more than one conduit in the unbonded portions between said strips.

5. A heat exchange component according to claim 1 in which the size of said tubular passageway varies in accordance with the shape of a weld-inhibiting material applied to one of the sheets.

6. A heat exchange component according to claim 1 formed into a heat exchange shape.

7. A heat exchange component according to claim 6 in which in a transverse cross section, the major axis of the component and the axis of the shape are parallel.

8. A heat exchange component according to claim 6 in which in a transverse cross section, the major axis of the component and the axis of the shape are perpendicular.

9. A heat exchange component according to claim 6 in which said desired shape is a spiral.

10. A heat exchange component according to claim 6 in which said desired shape is a figure eight.

References Cited

UNITED STATES PATENTS

| 2,107,031 | 2/1938 | Evans | 165—170 X |
| 2,286,271 | 6/1942 | Higham | 165—183 X |
| 2,998,639 | 9/1961 | Forst et al. | 165—170 X |
| 3,294,162 | 12/1966 | Loehlein et al. | 165—181 |
| 3,360,040 | 12/1967 | Kritzer | 29—157.3 X |

ROBERT A. O'LEARY, Primary Examiner

ALBERT W. DAVIS, Assistant Examiner

U.S. Cl. X.R.

29—157.3; 62—515; 165—121, 170